United States Patent [19]

Bálint et al.

[11] Patent Number: 4,983,302
[45] Date of Patent: Jan. 8, 1991

[54] COMPLEX PREPARATION-PROCESS FOR DECREASING THE NON-RADIOACTIVE SALT CONTENT OF WASTE SOLUTIONS OF NUCLEAR POWER STATIONS

[75] Inventors: Tibor Bálint; Tamás Drozda; Gyula Mózes; Mihály Kristóf; Éva Hanel, all of Veszprem; Péter Tilky, Paks, all of Hungary

[73] Assignee: Magyar Ásványolaj és Földgáz Kisérleti Intézet, Veszprèm, Hungary

[21] Appl. No.: 843,741

[22] Filed: Mar. 25, 1986

[51] Int. Cl.$^5$ .............................................. C02F 9/00
[52] U.S. Cl. .................................... 210/638; 210/639; 210/663; 210/665; 210/667; 210/682; 210/702; 210/751; 252/632
[58] Field of Search ................................ 210/663–669, 210/682, 266, 638, 652, 702, 723, 751, 806, 639; 252/631–633

[56] References Cited

U.S. PATENT DOCUMENTS

| | | | |
|---|---|---|---|
| 3,870,033 | 3/1975 | Faylor et al. | 210/900 |
| 4,033,868 | 7/1977 | Meichsner et al. | 210/682 |
| 4,107,044 | 8/1978 | Levendusky | 210/266 |
| 4,265,861 | 5/1981 | Cleary et al. | 423/10 |
| 4,377,508 | 3/1983 | Rothberg | 252/631 |
| 4,432,893 | 2/1984 | Lee et al. | 252/631 |
| 4,501,691 | 2/1985 | Tanaka et al. | 252/631 |

FOREIGN PATENT DOCUMENTS

| | | |
|---|---|---|
| 0035650 | 2/1981 | European Pat. Off. |
| 0070989 | 5/1982 | European Pat. Off. |
| 2154047 | 8/1985 | United Kingdom |
| 2157276 | 10/1985 | United Kingdom |
| 2159320 | 11/1985 | United Kingdom |

Primary Examiner—Ivars Cintins
Attorney, Agent, or Firm—Schweitzer & Cornman

[57] ABSTRACT

A complex separation process and apparatus for decreasing non-radiactive salt content of waste solutions of nuclear power stations. The process significantly deceases in non-radioactive salt-content of waste solutions arising from nuclear power stations.

Process is essentially based upon a suitable combination of up-to-date separating operations, such as precipitation, filtration, ultra-filtration, reverse osmosis, ion-exchange, evaporation and crystallization. Practically total amount of components carrying radioactivity (except tritium) can be effectively separated from the non-radioactive salts. Part of inactive salts (alkali nitrates) can be handled as industrial waste and the other part (boric acid) can be recycled. In the process precipitation, ion-exchange, reverse osmosis and crystallization are operations completing or replacing each other. Reverse osmosis is used not only for separating water and soluble, but for the separation of solved components.

8 Claims, 2 Drawing Sheets

COMPLEX PREPARATION-PROCESS FOR DECREASING THE NON-RADIOACTIVE SALT CONTENT OF WASTE SOLUTIONS OF NUCLEAR POWER STATIONS

This invention relates to a process for decreasing non-radioactive salt content of a waste solution of low or intermediate activity in from nuclear power stations containing predominantly decontaminating agents, such as oxalic acid, permanganate, boric acid and/or borates, furthermore alkali nitrate, by applying combined operations of separation preparing a waste solution concentrate of low non-radioactive salt content, to be solidified. As a result the amount of solidified waste can be decreased considerably. From the waste solution the complex separation-process provides two, preferably three products: a radioactive and an non-radioactive product, where one part of the non-radioactive product can be recycled for reuse and the other part can simply discarded as common industrial waste.

Components of waste solutions of low and intermediate activity arise essentially from three sources: from the heat-transferring fluid in the primary cycle, containing boric acid as a main component; from the decontaminating solutions containing permanganates, boric acid, oxalic acid and/or oxalates, citric acid and/or citrates, etc., and alkali hydroxide; and from the solutions used for the regeneration of ion-exchangers containing alkali hydroxide (KOH, NaOH) and strong mineral acids (mainly $HNO_3$).

Radioactive components of waste solutions originate from two main sources: activated corrosion products of the construction materials of the primary cycle (Co, Fe, Mn, Cr, Zr, etc.) furthermore radioactive isotopes (Cs, Sr, Rb, Nb, etc.) arising from radioactive decomposition. Radioactivity is present in the waste solution through to ions and macro- and colloid particles.

Waste solutions are conditioned for a 1 year long storage at 20° C. by chemical treatment (Described in Hungarian Patent Application Nos. 1876/82 and 1947/84). Accordingly, a stable concentrate of 250-900 g salt/$dm^3$ can be obtained by evaporation from the solution that was so conditioned. After storage, and optionally additional evaporation, waste is solidified (embedding in cement or bitumen) and the solid material obtained is closed into reservoirs and buried at designated places of special safety.

As it is known from the state of art the cost of preparation of 1 $m^3$ embedded product is very high and is constantly increasing. The salt content of a cubic meter embedded waste can amount to 5-15 mass %.

For every 1 GW/year power of a nuclear power station 170 tons/year output of non-radioactive salt has to be expected. Consequently it can be concluded that the cost of burying wastes is essentially determined by the amount of non-radioactive salt buried together with the radioactive components. Provided that radioactivity controlled the amount of waste to be buried, the originally 600-1000 $m^3$/year volume related to 1 GW/year power could be reduced to 45 $m^3$.

Several methods are known in nuclear energetics for separation of radioactive components of wastes (K. W. Carley-Macauly et al.: Radioactive Waste: Advanced Management Methods for Medium Active Liquid Waste. Hardwood Academic Publishers. CEN and United Kingdom Atomic Energy Authority, Brussels and Luxemburg, 1981.). By precipitation a decontamination factor (DF) of more than 100 can be achieved for certain isotopes. Ion-exchange has been also an applied method for a long time. Different separation methods using membranes, e.g. ultra-filter, reverse osmosis, are known as well. Not only particles of colloidal size but mono- and multivalent ions can also be separated by the membrane-technique. Even the separation of alkali metal nitrate and boric acid can be carried out with good efficiency [Ito, Y.: (Mitsubishi Heavy Industries Ltd.) Japan Kokai Tokyo Koho 8000, 430; Johannsen, K. H., Grossmann, Ch.: Acta Hydrochim. Hydrobiol. 9 (5) 535 (1981)].

No complex process is known for decreasing non-radioactive salt content of waste solutions to be buried which is effective independently of the concentration of the components and at the same time can fulfil the very strict requirements regulating emission of non-radioactive wastes (alkali nitrate content has to be smaller than 0.1%) and recycling of boric acid.

Anti-pollution, anti-radiation regulations and technical-economical requirements can be satisfied only by a suitable selection of separation-operations, by their combination and co-ordination.

The process according to the present invention is illustrated on FIG. 1. and 2.

Figure 1:
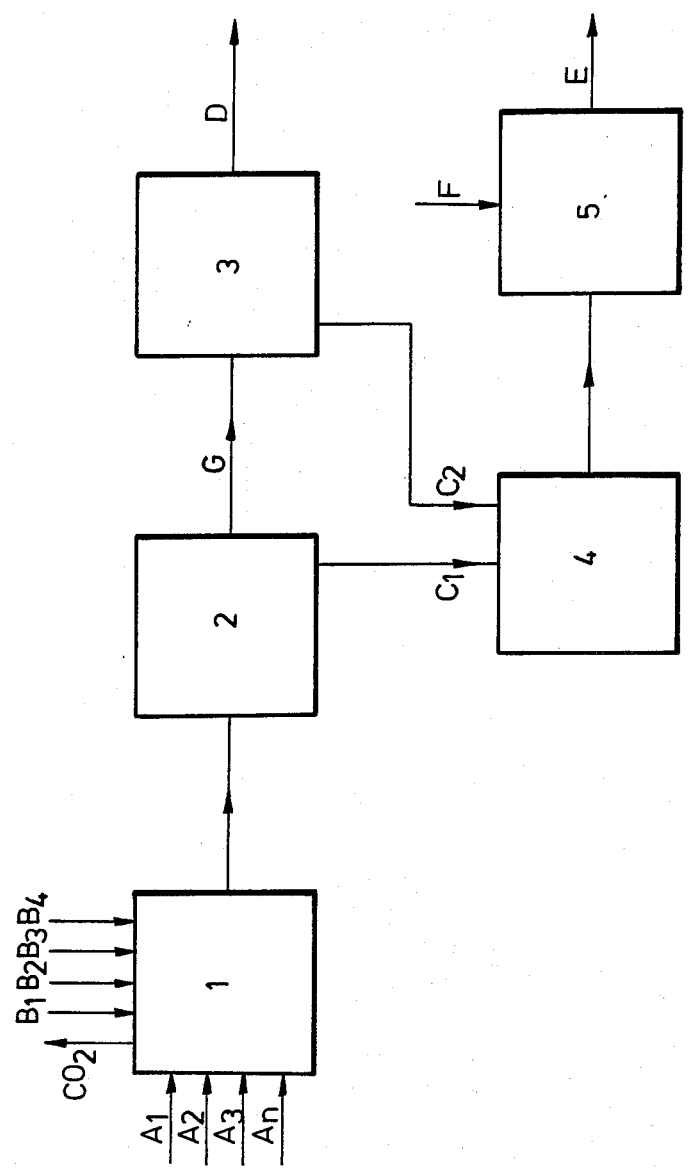
FIG. 1 shows the block-scheme of the process generally applied for handling waste solutions at nuclear power stations Type VVER-440.

The most up-to-date technology for processing the waste solutions of nuclear reactor Type VVER-440 is based upon Hungarian Patent Application Nos. 1876/82 and 1948/84. This process (FIG. 1) with minor modifications can be adapted to reactors of other type.

$\Sigma A_i$ waste solution accumulates in 1 reservoir from $A_1, A_2, A_3 \ldots A_n$ sources. Solution in the reservoir filled up is homogenized, analyzed and ($B_1$) the amount of permanganate to be added is calculated (The amount of permanganate has to be enough to oxidize fully oxalic acid and/or citric acid, hydrazine, etc., the salts of these, other oxidizable materials, e.g. complexons). $B_2$ is the amount of acid ($HNO_3$). From the reservoir $CO_2$ produced can be eliminated, manganese oxide hydroxide can be precipitated by $B_3$ aeration of the solution. $B_4$ lye is introduced into the same reservoir to stabilize solubility of boric acid. $C_1$ precipitate from 2 filter gets into 4 storage vessel where it is accumulated together with $C_2$ concentrate of 3 evaporator obtained from G diluted chemically treated waste solution. $D_1$ means the condensate of the evaporator. After a 1 year long decomposition period (decomposition of isotopes of short half-life) waste concentrate with a salt content of 300-500 g/l is taken from 4 storage vessel for embedding (cementing). Concentrate is solidified by F additives (usually cement and other additives) and E solid product (blocks solidified in barrels) is deposited in depository for final storage.

Figure 2:
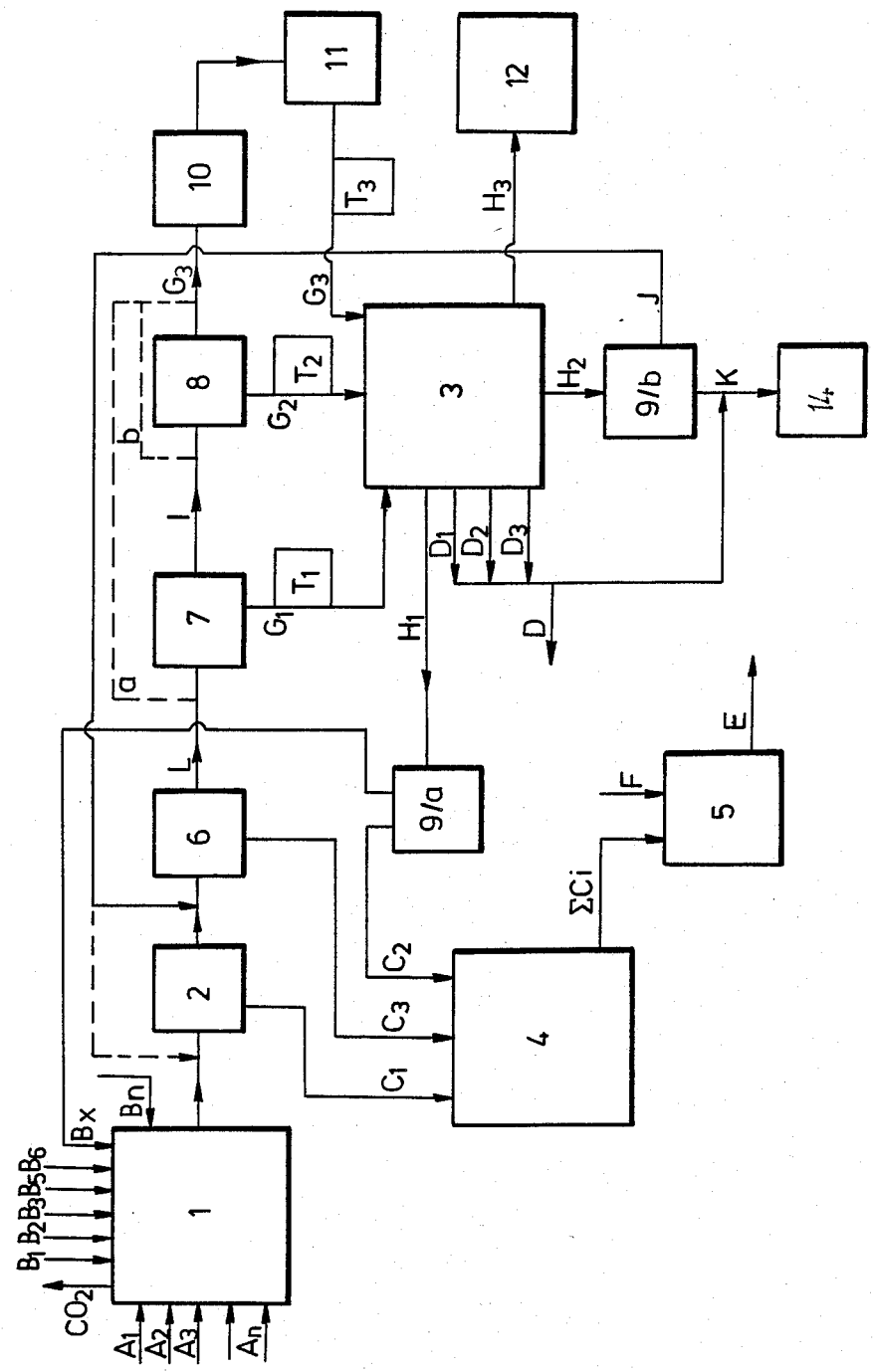
FIG. 2 shows the block diagram of one of the most preferred combinations of the selected operations for separation according to our method.

In accordance with our present invention the waste solution is devided into at least two, preferably into three products by combining separating operations (FIG. 2). Radioactive $\Sigma C_i$ product-stream contains radioactivity (except tritium) predominantly together with a small fraction of total inactive salt content. The other product stream $H_2+H_3$ carrying most of non-radioactive salts suitably is separated in two parts: $H_3$ contains predominantly nitrates mainly alkali (sodium or potassium) nitrates, $H_2$ contains boric acid. $H_3$ has sufficiently low or no radioactivity to be discarded as common industrial waste. $H_2$, having a nitrate content of smaller than 0.1% by weight m/m, can be re-used in the primary cycle.

Process invented is founded on the recognitions as follows:

(1.) Radioactivity in waste solutions is inherent to formations, viz. macro- and colloid particles, two or multivalent ions (Cr, Mn, Co, Fe, Sr, Zr, Nb, Ce, Ru, Sb particles or ions), which can be separated from the non-radioactive salts containing mainly nitrates and boric acid with some separating operations, such as 1 precipitation, 2 filtration, 6 ultra-filtration, 7 and 8 reverse osmosis, 10 and 11 ion-exchange.

(2.) Alkali nitrates and borates, representing the main part of inactive salt content, can be selectively separated by 7 or 8 reverse osmosis and/or 9/a-b crystallization.

(3.) $G_3$ stream of products containing nitrates can be purified of residual radioactivity, i.e. of residual two or multivalent ions, by 10 ion-exchange, preferably by complexing ion-exchange, and of cesium carrying radioactivity (134+137$_{Cs}$) by the highly selective ion-exchangers of 11 column containing salts of ferric ferrocyanide, $K_2Me[Fe(CN)_6]$, $Co^{+2}$, $2n^{+2}$, etc.

(4.) The application of above separating operations was established by preceeding patent applications (Hungarian Patent Appl. Nos. 1876/82 and 1947/84) related to a process applying reduction, e.g. treatment by oxalic acid or citric acid, and permanganate-elimination, wherein (before $B_4$ lye addition) a waste solution is formed containing alkali nitrate and boric acid as main components. Above solution is the starting material of the process of the present invention. Solution is concentrated by 3 evaporation to obtain a concentrate with a salt content of maximum 50 kg salt/m$^3$, however, we point out, that this operation is not crucial concerning the process and small advantage only can be expected from its application.

According to cited references starting solution containing the mentioned radioactive components is made acidic by $B_2$ acid, furthermore an $B_1$ oxidating agent is added to the solution. The necessary amount of $B_2$ and $B_1$ is determined by the stoichiometry of the following reaction:

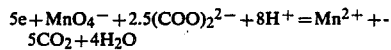

$$5e + MnO_4^- + 2.5(COO)_2^{2-} + 8H^+ = Mn^{2+} + 5CO_2 + 4H_2O$$

(Oxalic acid can be substituted with any equivalent reducing agent.) No excess oxalic and/or citric acid, i.e. reducing agent or acid (except boric acid) should remain in the solution and no manganese in higher oxidation state than +2 should be formed.

$B_3$ aeration carried out also according to the cited references expels $CO_2$ of the solution and simultaneously $Mn^{+2}$ is oxidized to manganese oxide hydroxide insoluble in water. This oxidation process takes place already in the slightly acidic solution of boric acid (pH=5). As a result of elimination, aeration and precipitation/filtration main components of the solution are alkali nitrates, namely sodium and potassium nitrate and boric acid.

Particles and ions carrying radioactivity, not separated by precipitation of manganese oxide-hydroxide ionadsorption, ion-exchange, etc., remain in solution. Decontamination factors (DF) of about 200 and about $1.10^4$ for $Cr^{+3}$ and $Co^{+2}$, respectively, determined by radioactive indication method, characterize the efficiency of the separation. For the colloid- and macroparticles DF values are even higher being these particles centres for precipitation.

At prevailing pH conditions salts of $B_5$ $Fe^{+3}$, $B_6$ $Al^{+3}$ and $B_7 Co^{+3}$ were found to be effective precipitating agents because they hydrolize in water and form hydroxides.

For adsorbing and eliminating $^{134}Cs^+$ and $^{137}Cs^+$ effectively the preparation of precipitate $BaSO_4$ $B_8$, $B_9$ and $K_2Me[Fe(CN)_6]B_{10}$, $B_{11}$ in the solution is advantageous (DF is about 100).

Applying precipitating agents $B_5$, $B_6$, ... $B_n$ together the effect of each agent is increased due to co-precipitation and flocculation. Low solubility of precipitate produced (solubility exponents are above 10 or as high as 30–40) makes possible to apply reagents in a concentration smaller than 0.1–0.2%, preferably 0.1–100 ppm. Precipitation is a very effective, simple and unexpensive operation for separation. Concentration of ions pertaining to radioactivity is usually very small, that means, amounts used for precipitation provide an effective separation.

Precipitation is completed by 1 traditional and 6 ultra-filtration (to 0.1 /μm). Result of these operations can be characterized by a high DF, furthermore these operations are the necessary pretreatments of the waste solutions before 7, 8 reverse osmosis.

According to our invention further processing of waste solution, origenating in a nuclear power station after 1 precipitation 2 and 6 filtration follows by the 7 and 8 two-stage reverse osmosis connected consecutively. First 7 stage is used for separating two and multivalent ions from alkali nitrates and boric acid. For this purpose those reverse-osmosis-membranes are especially suitable which have relatively high (>70–80%) retention for multivalent ions, and, at the same time, relatively small (<30%) retention (R) for monovalent ions ($Na^+$, $K^+$, $NO_3^-$) and boric acid passes through membrane practically without retention G concentrate from 7 reverse osmosis unit having a DF of 30–100 for multivalent ions pertaining to radioactivity related to I permeate after 3 evaporation and crystallization of K boric acid from concentrate $H_1$ gets as $C_2$ into 4 storage vessel and finally for 5 embedding by addition of F additive and for E burying.

From DF values of 1 precipitation, 2 and 6 filtration and 7 reverse osmosis it can be concluded that $\Sigma C_i$ radioactive stream contains at least 99%, preferably 99.99% of total radioactivity (except tritium) of $\Sigma A_i$ waste solution processed.

Input of 8 reverse osmosis unit is I permeate from 7 reverse osmosis unit containing mainly alkali nitrates and boric acid. Membrane, applied in 8 reverse osmosis unit have a high retention (>80–90%) for alkali nitrates (and for NaCl, which material is used as reference for reverse osmosis units) and is almost entirely permeable for boric acid (measured R value is 10%). Concentrate of 8 unit is $G_3$ product-stream, containing nitrates, while $G_2$ permeate contains boric acid.

Concept of the present invention is that $G_3$ product-stream containing nitrates can be processed as an industrial waste. In accordance with this concept waste solution which have a radioactivity higher than that specified in regulations for industrial wastes are purified further by 10 and 11 ion-exchange.

When measurement indicates that radio-activity surpasses the permitted level, waste solution is treated passing through 10 and 11 ion-exchangers containing ion-exchange resins selective for multivalent ions and supported $K_2Me[Fe(CN)_6]$ for separating monovalent $Cs^+$ ions.

$G_3$ product-stream containing nitrates prior to or after 10 and 11 purification is evaporated 3 and $H_3$ concentrate is stored as an 12 industrial waste.

$G_2$ permeate from 8 separation contains mainly boric acid and as impurities nitrates. According to the process invented K boric acid is recycled (boric acid is used as neutron-moderator in the primary cycle). Content of impurities (the alkali nitrate especially the content of sodium ions) has to be decreased to such a low level ($NaNO_3 \leq 0.1\%$ by weight) that solution should be suitable for recycling into the boric acid regenerator 13 of the nuclear power station without overloading this unit. Therefore after evaporation product-stream is purified by crystallization 9/b to achieve the required purity.

The complex process for separation comprises the production of different recycled- and side-streams, i.e. $B_x$ boric acid obtained by crystallization of radioactive product-stream is recycled preferably back to the start of the process (to precipitation 1), exhausted ion-exchangers 10 and 11 used for purifying product-stream containing nitrates is taken to the 4 storage vessel for radioactive products, mother-lye obtained from $H_2$ product stream containing boric acid by 9/b crystallization is recycled into the process before ultra-filtration. $D_1$, $D_2$ and $D_3$ condensates of 3 evaporation is used partly for solving K boric acid but is utilized mainly according to regulations for wastes of nuclear power stations. $G_1$, $G_2$ and $G_3$ diluted waste solutions are evaporated preferably applying the same 3 evaporator alternately. For crystallization of $H_1$ and $H_2$ concentrates containing boric acid the same 9/a, 9/b crystallizer is used. Obviously, installation of $T_1$, $T_2$ and $T_3$ storage tanks before 3 evaporator is unavoidable.

At the expense of some disadvantages separations by 7 and 8 reverse osmosis can be omitted. In this case the whole L product-stream has to be purified by 10 and 11 ion-exchange and the total amount of inactive concentrate obtained by 3 evaporation has to be handled as industrial waste or, as an alternative, K boric acid in a purity required can be obtained by 9 crystallization but at least in two steps.

A more developed process is when at least a one-stage 7 reverse osmosis is applied. This way loading of 10 and 11 ion-exchangers is smaller (about 10–20%) but separation of boric acid in the necessary purity is difficult.

Another embodiment of the present invention is when $B_5 \ldots B_n$ precipitating agents are not used but the loading of 10 and 11 ion-exchangers are intensify. Applying a very effective precipitation (application of precipitating agents in more stages or in large excess) 10 and 11 ion-exchangers can be omitted in whole or in part.

Technological and economical parameters of the process according to the present invention are illustrated by the following examples.

COMPARATIVE EXAMPLE

Data of the most up-to-date process for processing waste solution arising from a nuclear power station are as follows:

| | | |
|---|---|---|
| Amount of waste solution to be processed: | ($\epsilon A_n$) | = 40000 m3/year |
| Average concentration of waste solution processed | c | = 1.9 kg/m³ |
| Inactive salt-content after chemical treatment and stabilization of solubility: | $\epsilon M$ | = 82 tons/year |
| Volume of concrete-blocks produced | E | = 350 m³/year |

EXAMPLE

Waste solution specified in comparative example was processed according to our invention. Data obtained are as follows: (Data are calculated on basis of large-scale laboratory measurements.)

Composition of waste-solution (40000 m³/year; salt-content is 1.9 kg/m³);

| | tons/year |
|---|---|
| $H_3BO_3$ | 27 |
| Oxalic acid | 7.6 |
| Alkali nitrates | 38 |
| $KMnO_4$ | 3.4 |
| Total | 76.0 = $\Sigma M$ |

Amount of reagents added for precipitation $\left( \sum_{i=5}^{n} B_i \right)$:

| | kg/year |
|---|---|
| $Fe(NO_3)_3 \cdot 6H_2O$ | 4 |
| $Al(NO_3)_3 \cdot 9H_2O$ | 15 |
| $Ba(NO_3)_2$ | 105 |
| $H_2SO_4$ | 400 |
| $K_4Fe(CN)_6 \cdot 3H_2O$ | 400 |
| $Co(NO_3)_3$ | 200 |

Parameters of each operation are given in Table 1. The symbols are as follows:
C  concentration of salt, kg/m³
V  volume-stream, m³/yr;
M  amount of inactive salt, tons/yr;
N  index for alkali nitrate;
B  index for boric acid.

TABLE 1

Parameters calculated on the bases of results of large-scale laboratory measurements

| Operation Unit | Input and product | Volume-stream, V m³/year | $C_N$ kg/m³ | $C_B$ kg/m³ | c kg/m³ | M t/year | Notes |
|---|---|---|---|---|---|---|---|
| 1 accumulation, chemical treatment | $A_n + B_n$ | 40000 | 1.02 | 0.675 | 1.70 | 68 | 7.4 tons/year $CO_2$ aera |
| 1 precipitation 2,6 filtration | $C_1 + C_3$ | 10 | — | — | 300 | 3 | predominantly MnO(OH) DF ≈ 100 |
| 7 reverse osmosis | L | 40000 | 1.02 | 0.88 | 1.90 | 76 | |
| | $G_1$ | 6000 | 3.07 | 1.20 | 4.27 | 25.6 | Radioactive product-stream |
| | I | 34000 | 0.66 | 0.82 | 1.48 | 50.4 | Inactive product-stream DF ≈ 100 |

TABLE 1-continued

| | | Parameters calculated on the bases of results of large-scale laboratory measurements | | | | | |
|---|---|---|---|---|---|---|---|
| Operation Unit | Input and product | Volume-stream, V m$^3$/year | $C_N$ kg/m$^3$ | $C_B$ kg/m$^3$ | c kg/m$^3$ | M t/year | Notes |
| 8 reverse osmosis | I | 34000 | 0.66 | 0.82 | 1.48 | 50.4 | |
| | G$_2$ | 29000 | 0.085 | 0.73 | 0.82 | 23.8 | Product-stream with bo |
| | G$_3$ | 5000 | 4.000 | 1.29 | 5.29 | 26.5 | Product-stream with nit |
| | G$_1$ | 6000 | 3.07 | 1.20 | 4.27 | 25.6 | |
| | H$_1$ | 30 | 614 | 240 | 854 | 25.6 | |
| | D$_1$ | 5970 | 0 | 0 | 0 | 0 | DF > 10$^5$ |
| 3 evaporation | G$_2$ | 29000 | 0,085 | 0.73 | 0.82 | 23.8 | |
| | H$_2$ | 72.5 | 35 | 292 | 327 | 23.7 | |
| | D$_2$ | 28927 | 0 | 0 | 0 | 0 | DF > 10$^5$ |
| | G$_3$ | 5000 | 4.00 | 1.29 | 5.29 | 26.5 | |
| | H$_3$ | 50 | 400 | 129 | 529 | 26.5 | into 12 |
| | D$_3$ | 4950 | 0 | 0 | 0 | 0 | DF > 10$^5$ |
| 9/a, 9/b | H$_1$ | 30 | 614 | 240 | 854 | 25.6 | |
| | C$_2$ | 30 | 600 | 40 | 640 | 19.2 | into 4 |
| | B$_x$ | 20 | 21 | 300 | 321 | 6.4 | Solved hot and recycle |
| crystalliza- | H$_2$ | 72.5 | 35 | 292 | 327 | 23.7 | |
| tion | J | 60 | 41 | 40 | 81 | 4.8 | Recycled into the proc before 6 |
| | K | 400 | 0.04 | 47.3 | 47.3 | 18.9 | into 13, for reuse |
| 10 complexing ion-exchange | G$_3$ | 5000 | 4.00 | 1.29 | 5.29 | 26.5 | DF > 1000 for multival ions |
| 11 ion-exchange with supported K$_2$Co[Fe(CN)$_6$] | G$_3$ | 5000 | 4.00 | 1.29 | 5.29 | 26.5 | DF > 1000 for $^{134}$Cs+ |
| 4 storage | C$_1$ + C$_3$ | 10 | — | — | 300 | 3 | |
| vessel | C$_2$ | 30 | 600 | 40 | 640 | 19.2 | |
| | C$_i$ | 40 | 450 | 30 | 555 | 22.2 | |
| 5 cementation | C$_i$ | 40 | 450 | 30 | 555 | 22.2 | |
| | F | — | — | — | — | — | ca. 200 tons of cement |
| | E | 95 | 190 | 12 | 202 | 266 | 95 m$^3$/year |

From data of Table 1 conclusion can be drawn that volume of blocks of concrete compared with the volume of blocks made by the traditional technology decreased from 350 m$^3$/year to 95 m$^3$/year. Costs of operation are proportionally smaller. A further advantage is that considerable part of boric acid is recycled resulting in a decreased consumption of chemicals. Chemical composition of embedded inactive salt changes improving both mechanical properties and isotope-retention of the blocks in percolating liquids. Above factors are the most important evaluating blocks from the point of view anti-pollution protection.

Units of operations of the process invented are compatible with existing technologies.

What is claimed:

1. A complex separation process for treating liquid waste of intermediate radioactivity level from a nuclear power plant to decrease the non-radioactive content of said liquid waste, said liquid waste containing (a) non-radioactive materials comprising at least alkali metal nitrates and boric acid, and (b) radioactive material; comprising separating said liquid into a first, primarily radioactive stream, and a second, primarily non-radioactive stream, said first stream comprising at least 99% of the radioactive material contained in said liquid waste, excepting tritium, and less than half of the non-radioactive material contained in said liquid waste material, said second stream containing the balance of said non-radioactive material and then concentrating said first stream for safe storage, whereby the total mass of solid material contained in said liquid waste that is produced is significantly reduced for safe storage.

2. A process according to claim 1, wherein said second, primarily non-radioactive stream is further separated into a third stream containing boric acid as a major component, and a fourth stream containing alkali metal nitrate as a major component, said alkali metal nitrate stream being in a condition of such low or no radioactivity to be capable of being discarded as non-hazardous industrial waste.

3. A process according to claim 2, wherein the separation of said liquid waste into said first stream and said second stream, comprises adding a precipitating agent to the liquid waste, said agent being selected from the group consisting of manganese oxide, Fe(OH)$_3$, Al(OH)$_3$, BaSO$_4$, K$_2$Me[Fe(CN)$_6$] and mixtures thereof, wherein Me is selected from the group consisting of CO$^{2+}$, Zn$^{2+}$, Ni$^{2+}$ and Cu$^{2+}$ to form a precipitate, then separating said precipitate by at least one filtration step, subjecting said second stream to osmotic separation to leave a solution containing at least boric acid, and concentrating said boric acid containing solution by evaporation and crystallization.

4. A process according to claim 2 wherein the separation of said second stream into said third stream containing boric acid and said fourth stream containing primarily alkali metal nitrate is effected by reverse osmosis and/or crystallization, and said fourth stream containing alkali metal nitrate is contacted with an ion exchange medium containing K$_2$Me[Fe(CN)$_6$] to selectively separate ions selected from the group consisting multivalent ions and Ce+, wherein Me is selected from the group consisting of Co$^2$, Zn$^{2+}$, Ni$^{2+}$ and Cu$^{2+}$.

5. A process according to claim 2 wherein the separation of said second stream into said third stream containing boric acid and said fourth stream containing primarily alkali metal nitrate is effected by reverse osmosis and/or crystallization, and said third stream containing boric acid is further purified by evaporation and crystallization, said purified boric acid having a maximum alkali metal nitrate content of about 0.1%.

6. A process according to claim 1 wherein said second stream obtained from said liquid waste by separating therefrom said first stream is subjected to an ion exchange process and to concentration by evaporation to produce a substantially non-radioactive waste that can be discarded.

7. A process according to claim 1 further comprising subjecting said second stream to a reverse osmosis treatment to form a third stream containing alkali metal nitrates and a fourth stream containing boric acid, subjecting said third stream to evaporation to form a solution of alkali metal nitrates that can be discarded as nonhazardous industrial waste, subjecting said fourth stream to evaporation and crystallization whereby a stream is provided that contains boric acid.

8. A complex separation process for treating liquid wastes of intermediate radioactivity level from nuclear power plants to decrease the non-radioactive content of said liquid wastes, said non-radioactive material comprising at least alkali metal nitrates and boric acid, the process comprising dividing said liquid waste into first, second and third streams by subjecting it to a reverse osmosis treatment, said first stream comprising primarily radioactive material, said second stream containing alkali metal nitrate, and said third stream containing boric acid, and further purifying each of said streams with ion exchange treatment, evaporation and crystallization.

* * * * *